(12) United States Patent
Yoshikawa et al.

(10) Patent No.: US 10,364,857 B2
(45) Date of Patent: Jul. 30, 2019

(54) DISC BRAKE APPARATUS

(71) Applicant: AKEBONO BRAKE INDUSTRY CO., LTD., Tokyo (JP)

(72) Inventors: Kazuhiro Yoshikawa, Tokyo (JP); Toshifumi Maehara, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/534,173

(22) PCT Filed: Dec. 16, 2015

(86) PCT No.: PCT/JP2015/085250
§ 371 (c)(1),
(2) Date: Jun. 8, 2017

(87) PCT Pub. No.: WO2016/098819
PCT Pub. Date: Jun. 23, 2016

(65) Prior Publication Data
US 2017/0343069 A1    Nov. 30, 2017

(30) Foreign Application Priority Data

Dec. 16, 2014  (JP) .................................. 2014-253711
Mar. 2, 2015   (JP) .................................. 2014-040026
Nov. 30, 2015  (JP) .................................. 2015-234064

(51) Int. Cl.
*F16D 59/02*     (2006.01)
*F16D 65/18*     (2006.01)
(Continued)

(52) U.S. Cl.
CPC .............. *F16D 65/18* (2013.01); *B60T 13/38* (2013.01); *B60T 17/08* (2013.01); *F16D 55/226* (2013.01);
(Continued)

(58) Field of Classification Search
CPC .......... F16D 59/02; F16D 55/31; F16D 55/33; F16D 2125/28; F16D 2125/32;
(Continued)

(56) References Cited

U.S. PATENT DOCUMENTS 2,620,901 A  * 12/1952 Stearns ................... F16D 55/36
                                                      116/208
3,995,722 A     12/1976 Jones et al.
(Continued)

FOREIGN PATENT DOCUMENTS

CN      A-1737398       2/2006
JP      S52-113187 U    8/1977
(Continued)

OTHER PUBLICATIONS

International Search Report dated Mar. 8, 2016 for PCT/JP2015/085250, including English translation.
(Continued)

*Primary Examiner* — Nicholas J Lane
(74) *Attorney, Agent, or Firm* — Drinker Biddle & Reath LLP

(57) ABSTRACT

A disc brake apparatus structured such that, on receiving a pressing force from an operating spring, a piston arranged within a cylinder formed in a caliper body presses a piston side pad. The disc brake apparatus includes a support part formed in a part of the caliper body, a reaction force receiver provided on and projected from the lateral side of the piston and opposed to the support part, and cam parts interposed between the support part and the reaction force receiver and, on receiving a rotation force, capable of spreading the distance between the support part and the reaction force receiver to thereby release the pressing force.

11 Claims, 13 Drawing Sheets

(51) Int. Cl.

| | | |
|---|---|---|
| *F16D 55/40* | (2006.01) | |
| *F16D 55/2265* | (2006.01) | |
| *F16D 65/00* | (2006.01) | |
| *B60T 13/38* | (2006.01) | |
| *B60T 17/08* | (2006.01) | |
| *F16D 55/226* | (2006.01) | |
| *F16D 65/46* | (2006.01) | |
| *F16D 121/10* | (2012.01) | |
| *F16D 121/14* | (2012.01) | |
| *F16D 121/22* | (2012.01) | |
| *F16D 121/26* | (2012.01) | |
| *F16D 125/32* | (2012.01) | |
| *F16D 125/36* | (2012.01) | |
| *F16D 125/40* | (2012.01) | |
| *F16D 125/64* | (2012.01) | |
| *F16D 125/28* | (2012.01) | |

(52) U.S. Cl.
CPC ......... *F16D 55/2265* (2013.01); *F16D 55/40* (2013.01); *F16D 59/02* (2013.01); *F16D 65/0068* (2013.01); *F16D 65/183* (2013.01); *F16D 65/46* (2013.01); *F16D 2121/10* (2013.01); *F16D 2121/14* (2013.01); *F16D 2121/22* (2013.01); *F16D 2121/26* (2013.01); *F16D 2125/28* (2013.01); *F16D 2125/32* (2013.01); *F16D 2125/36* (2013.01); *F16D 2125/40* (2013.01); *F16D 2125/64* (2013.01)

(58) Field of Classification Search
CPC .......... F16D 2125/64; F16D 2125/645; F16D 2121/005; F16D 2121/16; F16D 2121/26; F16D 2121/10; F16D 2121/12; F16D 2125/26
See application file for complete search history.

(56) References Cited

U.S. PATENT DOCUMENTS

| | | | |
|---|---|---|---|
| 4,202,430 A * | 5/1980 | Stevens | F16D 59/02 |
| | | | 188/162 |
| 4,923,036 A | 5/1990 | Margetts | |
| 5,076,401 A * | 12/1991 | Ta | B60T 13/22 |
| | | | 188/170 |
| 5,547,048 A | 8/1996 | Anthony | |
| 6,125,975 A * | 10/2000 | Seeto | B60T 13/746 |
| | | | 188/171 |
| 6,321,882 B1 * | 11/2001 | Heckel | F04C 2/104 |
| | | | 188/72.6 |
| 8,893,861 B2 * | 11/2014 | Ebner | B60T 17/081 |
| | | | 188/72.6 |
| 2006/0054425 A1 | 3/2006 | Maehara | |
| 2009/0166136 A1 * | 7/2009 | Eberle | F16D 55/30 |
| | | | 188/171 |
| 2015/0292580 A1 * | 10/2015 | Fichtner-Pflaum | F16D 55/36 |
| | | | 188/161 |

FOREIGN PATENT DOCUMENTS

| | | | | |
|---|---|---|---|---|
| JP | H08-184338 A | 7/1996 | | |
| JP | H10-507811 A | 7/1998 | | |
| JP | 2011-27132 A | 2/2011 | | |
| JP | 2011-80568 A | 4/2011 | | |
| WO | WO-2014189089 A1 * | 11/2014 | ........... | F16D 55/226 |
| WO | WO-2015098782 A1 * | 7/2015 | ............. | F16D 65/18 |

OTHER PUBLICATIONS

International Search Report/Written Opinion dated Mar. 8, 2016 for PCT/JP2015/085250 [non-English language].
CN Office Action dated Jul. 3, 2018 in corresponding Chinese Application No. 201580068619.9 (with attached Enlish-language translation).
CN Office Action dated Mar. 1, 2019 in Chinese Application No. 201580068619.9 (with attached English-language translation).

* cited by examiner

DISC BRAKE APPARATUS

TECHNICAL FIELD

The invention relates to a disc brake apparatus.

BACKGROUND ART

When a disc brake apparatus is used to hold a rotating body in industrial machinery and the like, in a negative type disc brake apparatus which uses the load of a disc spring directly as a braking force, there is generally known an apparatus which uses a hydraulic force to release the braking force. However, the system of the whole of the negative type disc brake apparatus is desired to exclude space and piping for employment of a hydraulic mechanism to thereby realize miniaturization and simplification.

In the negative type disc brake apparatus, as a method for applying a force to a piston using other means than the hydraulic mechanism, there is known a technology using a cam as disclosed in the patent document 2 and patent document 3. In a disc brake apparatus disclosed in the patent document 2, there is employed a structure in which an eccentric cam shaft is arranged in a penetration hole formed in the side surface of a piston and, when the eccentric cam shaft is rotated, a pressing force is applied to the piston. In a disc brake apparatus disclosed in the patent document 3, there is employed a structure in which a cam lever is arranged on the rear end of a piston and, when the cam lever is rotated, the piston is pushed out to thereby apply a pressing force to the piston.

PRIOR ART DOCUMENT

Patent Document

Patent document 1: JP-U-52-113187
Patent document 2: JP-A-2011-027132
Patent document 3: JP-A-10-507811

SUMMARY OF THE INVENTION

Problems that the Invention is to Solve

It is considered to be a very effective means to employ a cam mechanism as a braking force releasing mechanism in the negative type disc brake apparatus. However, as in the technology disclosed in the patent document 2, in the case that a structure adapted to arrange the eccentric cam shaft in the penetration hole formed to cross the axial direction of the piston is employed in the negative type disc brake apparatus, when the brake is released, there is applied to the eccentric cam shaft a spring force going in a direction to bend the shaft. Thus, in order to ensure safety, there is a problem that there arises the need to enhance the strength of the eccentric cam shaft (that is, to thicken the eccentric cam shaft) than necessary.

As in the technology disclosed in the patent document 3, in the case that the cam lever is arranged in the rear end of the piston, the cam lever adopts a structure in which it presses against the leading end face of the piston to thereby push back the piston. However, since a brake pad is arranged on the leading end face of the piston, practically, the structure disclosed in the patent document 3 cannot be employed.

The invention, while solving the above problems, has an object to provide a negative type disc brake apparatus which includes a pressing force releasing mechanism other than hydraulic pressure and also can enhance durability.

Means for Solving the Problems

The above object of the invention would be attained by the below-structured disc brake apparatus.

(1) A disc brake apparatus structured such that, on receiving a pressing force from an operating spring, a piston arranged within a cylinder formed in a caliper body presses brake pads, wherein the disc brake apparatus includes a support part formed in a part of the caliper body, a reaction force receiver provided on and projected from the lateral side of the piston and opposed to the support part, and cam parts interposed between the support part and the reaction force receiver and, on receiving a rotation force, capable of spreading the distance between the support part and the reaction force receiver to release the pressing force.

(2) A disc brake apparatus having the structure of the above (1) apparatus, wherein the operating spring is disc springs arranged in layers, and, in a penetration hole formed in the center of each of the disc springs, there is arranged a hold shaft with the two ends thereof supported on the caliper body so as to be slidable in the axial direction of a rotor.

According to the disc brake apparatus having such structure as the above (2) apparatus, there is no fear that displacement occurs in the disc springs arranged in layers, thereby enabling position adjustment of the piston and the like using the hold shafts.

(3) A disc brake apparatus having the structure of the above (1) or (2) apparatus, wherein the cam parts are arranged so as to be line symmetrically paired with the piston as a base point, and to the paired cam parts, there are connected rotation force input parts to be connected to the paired cam parts across the piston.

According to the disc brake apparatus having such structure as the above (3), the force used to release the pressing force given by the operating spring can be applied well in balance. Further, due to provision of the rotation force input part, the rotation force can be input into both of the paired cam parts with one operation.

(4) A disc brake apparatus according having the structure of the above (3) apparatus, wherein, on such side surface of the caliper body as is located on the opposite side to the arranged position of the operating spring, there is provided an actuator for inputting an operating force into the rotation force input parts.

According to the disc brake apparatus having such structure as the above (4) apparatus, the disc brake apparatus can be slimmed. Thus, a degree of freedom of the installation position of the disc brake apparatus can be enhanced.

(5) A disc brake apparatus having the structure of the above (4) apparatus, wherein the rotation force input parts of the cam parts and the actuator are connected to each other by connecting members to be inserted into hole parts formed in the caliper body.

According to the disc brake apparatus having such structure as the above (5) apparatus, the movable part can be prevented from being exposed to the outside, thereby eliminating a fear that operation failure due to adhesion of dust or the like can occur.

(6) A disc brake apparatus having the structure of the above (5) apparatus, wherein the actuator is an air chamber for operating the connecting members with the force of air.

According to the disc brake apparatus having such structure as the above (6) apparatus, the structure of the actuator for operating the rotation force input parts of the cam parts can be simplified. Also, since the connecting members are operated with the operation of the air chamber, responsiveness is excellent.

(7) A disc brake apparatus having the structure of the above (5) apparatus, wherein the actuator is a motor gear unit for applying an operating force in a direction to release the pressing force to the rotation input parts through the connecting members.

According to the disc brake apparatus having such structure as the (7) apparatus, piping around the actuator can be eliminated. Also, there can be eliminated a tank for storing fluid necessary to operate the actuator, and a compressor.

(8) A disc brake apparatus having the structure of the (7) apparatus, wherein, to the motor gear unit, there are attached a ball screw rotatable by the operation of the motor gear unit, and a ball nut movable along the ball screw, and the connecting members are pushed out by the ball nut.

According to the disc brake apparatus having such structure as the (8) apparatus, even when torque generated by the motor gear unit is small, the pressing force of the operating spring can be released.

(9) A disc brake apparatus having the structure of the (8) apparatus, wherein each of the connecting members includes a magnetic body and, in the push-out position of the connecting member, there is provided an electromagnet capable of sucking the magnetic body.

According to the disc brake apparatus having such structure as the (9) apparatus, even when power supply to the motor is cut off, the released state of the pressing force of the operating spring can be maintained.

(10) A disc brake apparatus having the structure of the above (2) apparatus, or having any one of the structures of the above (3) to (9) apparatuses having the structure of the above (2) apparatus, wherein the hold shaft includes a threaded engagement part between the piston and itself, one of the two end parts of the hold part can slide through the piston to the caliper body, and the hold part is capable of adjusting a clearance between the brake pads and itself through the threaded engagement part.

According to the brake apparatus having such structure as the above (10) apparatus, even when the brake pad wears and the clearance between the rotor and pads is thereby increased, the sliding range of the piston can be adjusted so as to be in proper positions.

(11) A disc brake apparatus having the structure of any one of the above (1) to (9) apparatuses, wherein the piston includes on the lateral part thereof a flat surface formed along the projecting direction of the reaction force receiver, and the support part includes a surface to be contacted with the flat surface.

According to the disc brake apparatus having such structure as the above (11) apparatus, the support part plays a role of stopping the rotation of the piston.

Effects of the Invention

According to the disc brake apparatus having the above structure, there can be provided a negative type disc brake apparatus which, using the pressing force releasing mechanism other than hydraulic pressure, can release the pressing force given by the operating spring. Also, in comparison with a conventional cam mechanism, when a cam mechanism is employed, the durability thereof can also be enhanced.

MODE FOR CARRYING OUT THE INVENTION

Figure 1:
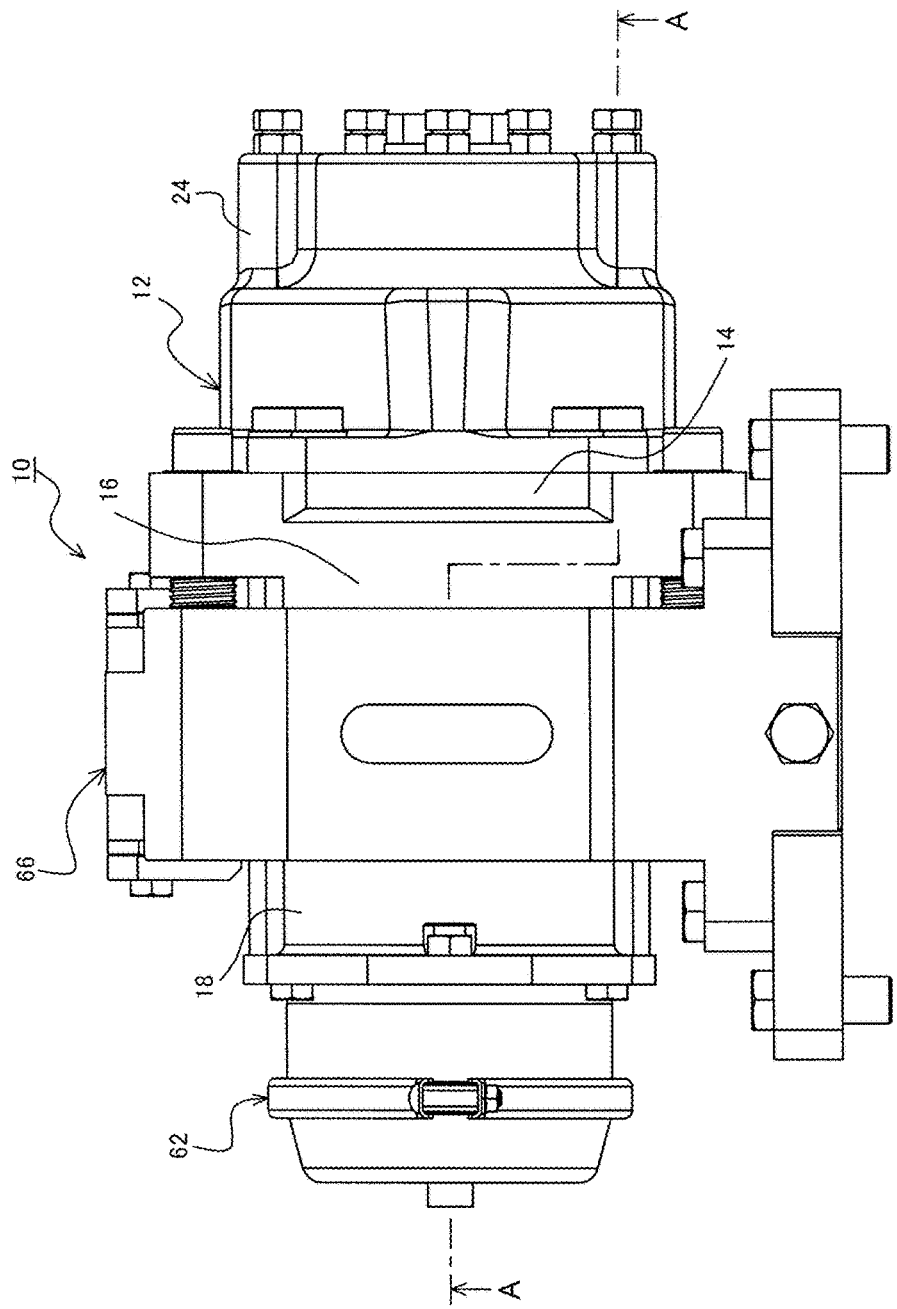
FIG. 1 is a view of the front structure of a disc brake apparatus according to a first embodiment of the invention.
Figure 2:
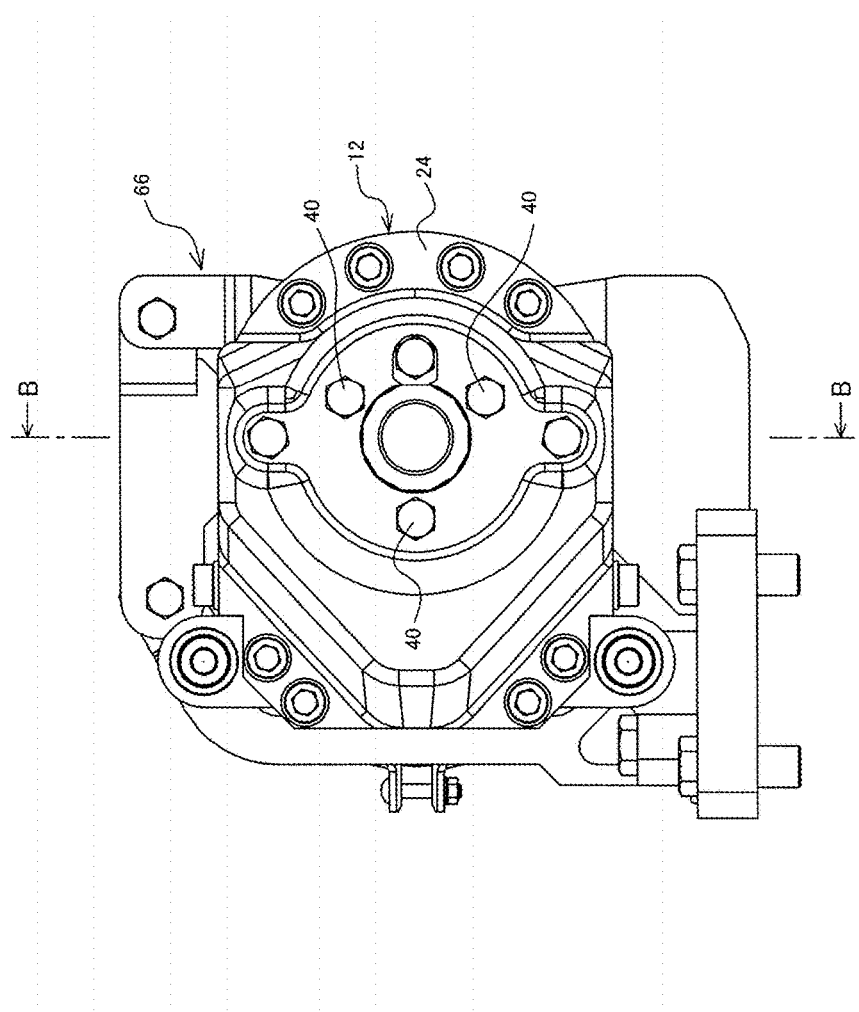
FIG. 2 is a view of the right side surface of the disc brake apparatus of FIG. 1.

Description is specifically given below of embodiments for carrying out a disc brake apparatus according to the invention with reference to the drawings.

A disc brake apparatus 10 according to a first embodiment of the invention, as shown in FIG. 1 to FIG. 4, in appearance, is basically constituted of a caliper body 12, two brake pads (piston side pad 50, claw side pad 56), and an air chamber 62, while the apparatus is supported through a support 66 on a fixing part (not shown).

Figure 4:
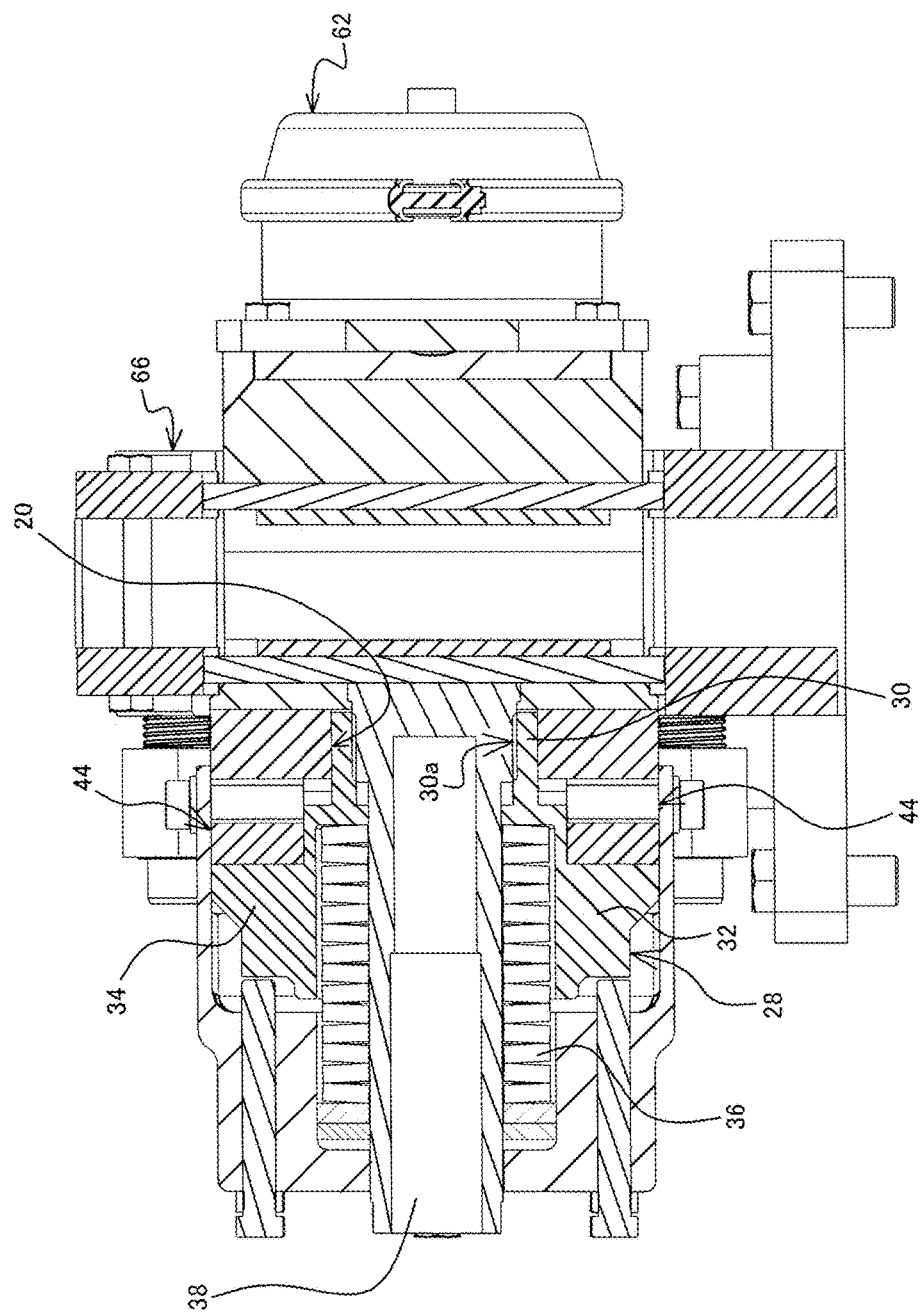
FIG. 4 is a partial section view of a part shown by the arrow B-B of FIG. 2.

The caliper body 12 basically includes a body main body 14, a claw part 18 and a bridge part 16. On the body main body 14, there are provided a cylinder 20 and a support part 22 and, on the side surface of the body 14 situated on the opposite side to a rotor 70, there is provided a case 24, thereby forming a bore 26 serving as an internal space. As shown in FIG. 4, on the cylinder 20, there is arranged the sliding part 30 of a piston 28 (the details of which are given below). Also, within the bore 26, there are arranged an operating spring 36, a cam mechanism 42 and so on.

Figure 6:
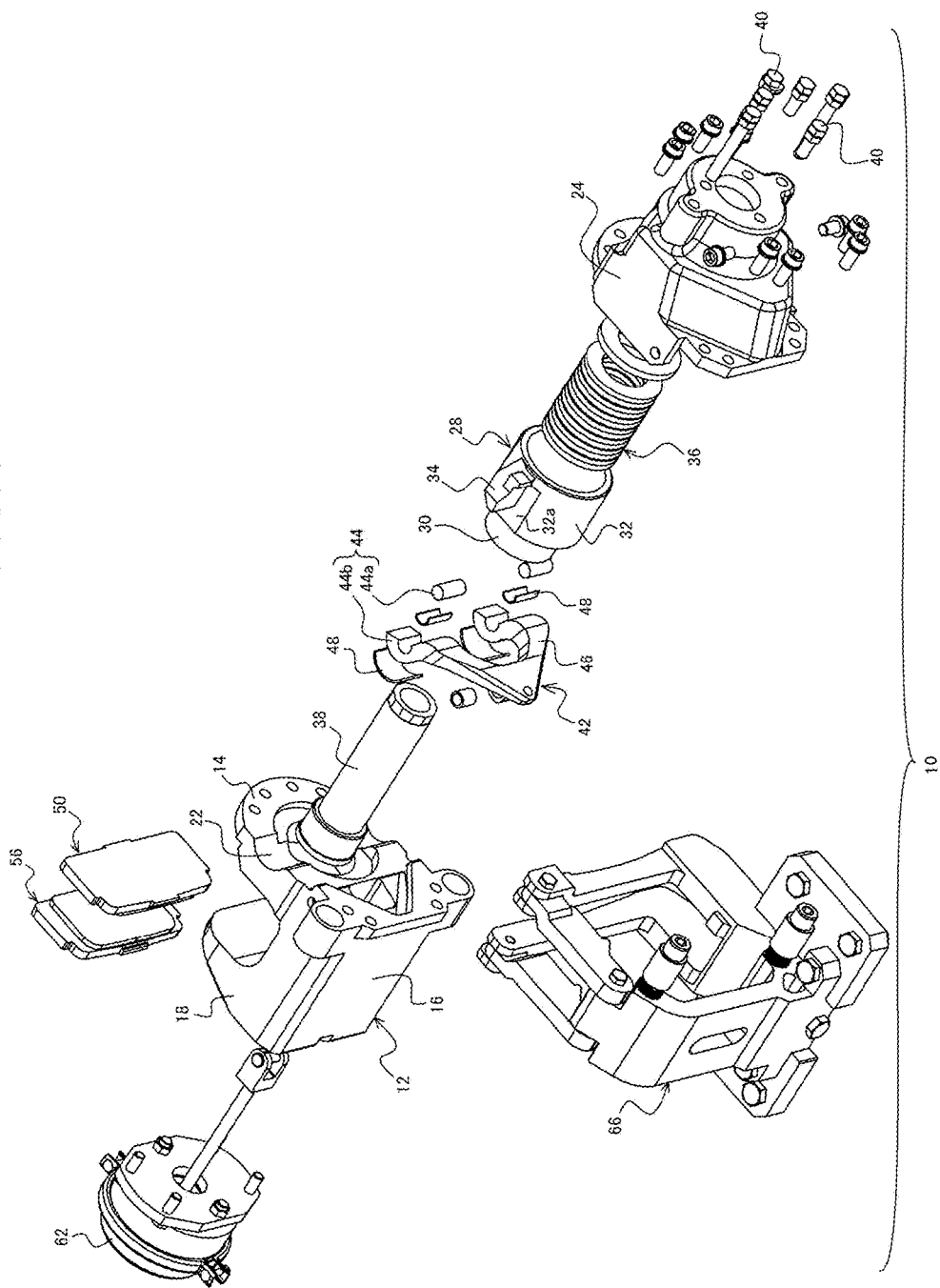
FIG. 6 is an exploded perspective view of the structure of the disc brake apparatus of the first embodiment.

The piston 28 of the first embodiment is constituted of the sliding part 30 and a linking part 32, while a reaction force receiver 34 is projectingly provided on the outer periphery of the linking part 32. The reaction force receiver 34 is used to receive a reaction force for releasing a pressing force given by the operating spring 36 and is disposed at a position opposed to the support part 22 formed in the body main body 14. With this structure, the reacting force receiver 34 is pressed with the support part 22 as a base point, thereby enabling release of the pressing force given by the operating spring 36. Also, the linking part 32 includes on the side portion thereof a flat surface 32a formed along the projecting direction of the reaction force receiver 34 (see FIG. 6). An eccentric member 44b of a cam part 44 (the details of which are described below) supported by the support part 22 is contacted with this flat surface 32a, thereby playing a role of preventing the piston 28 against rotation.

On the inner peripheral side of the sliding part 30, as shown in FIG. 4, there is formed a penetration hole 30a having a female thread; and, the threaded portion of an adjust pin 38 is threadedly engaged with the female thread of the penetration hole 30a. The adjust pin 38 plays a role of adjusting a clearance between the piston side pad 50 and claw side pad 56 respectively serving as the brake pads when they are worn, thereby adjusting the piston 28 so as to be positioned in a proper operating range; and, also serves as a hold shaft that holds disc springs serving as operating springs 36 (to be discussed later) in a layered manner. The one end part of the adjust pin 38 is contacted with the piston side pad 50 and the other end part has such a length as allows it to project outwardly of the case 24. Thus, the adjust pin 38 is arranged to penetrate through both of the sliding part 30 and linking part 32 of the piston 28 in the axial direction of the piston 28. Accordingly, the two end parts of the adjust pin 38 are supported slidably in the axial direction (X) of the rotor 70 through the piston 28 with respect to the caliper body 12.

The operating springs 36 are pressing means for pressing the piston 28. In the structure of the first embodiment, multiple disc springs, into which the other end part of the adjust pin 38 to be threadedly engaged with the piston 28 is inserted, are arranged in a layered manner. The operating springs 36 are interposed between the sliding part 30 of the piston 28 and the inner peripheral surface of the case 24 defining the bore 26. The pressing forces of the operating springs 36, after the case 24 is fixed to the body main body 14, are adjusted by an adjust bolt 40 threadedly engaged with the end part of the case 24. The leading end of the adjust bolt 40 is projected into the case 24 and, when the bolt head is fastened, the operating springs 36 are pressed to amplify the reacting forces (pad pressing forces) of the operating springs 36.

The cam mechanism 42 is an element which is interposed between the support part 22 of the body main body 14 of the caliper body 12 and the reaction force receiver 34 of the linking part 32 of the piston 28 and is used to push back the reaction force receiver 34 with the support part 22 as a base point. That is, the cam mechanism 42 is a pressing force releasing mechanism capable of releasing the pressing force given by the operating springs 36 using other pressure than hydraulic pressure. The cam mechanism 42 of the first embodiment is basically constituted of a cam part 44 and a lever part 46. The cam part 44 is arranged to correspond through the piston 28 to the paired two reacting force receivers 34.

Figure 5:
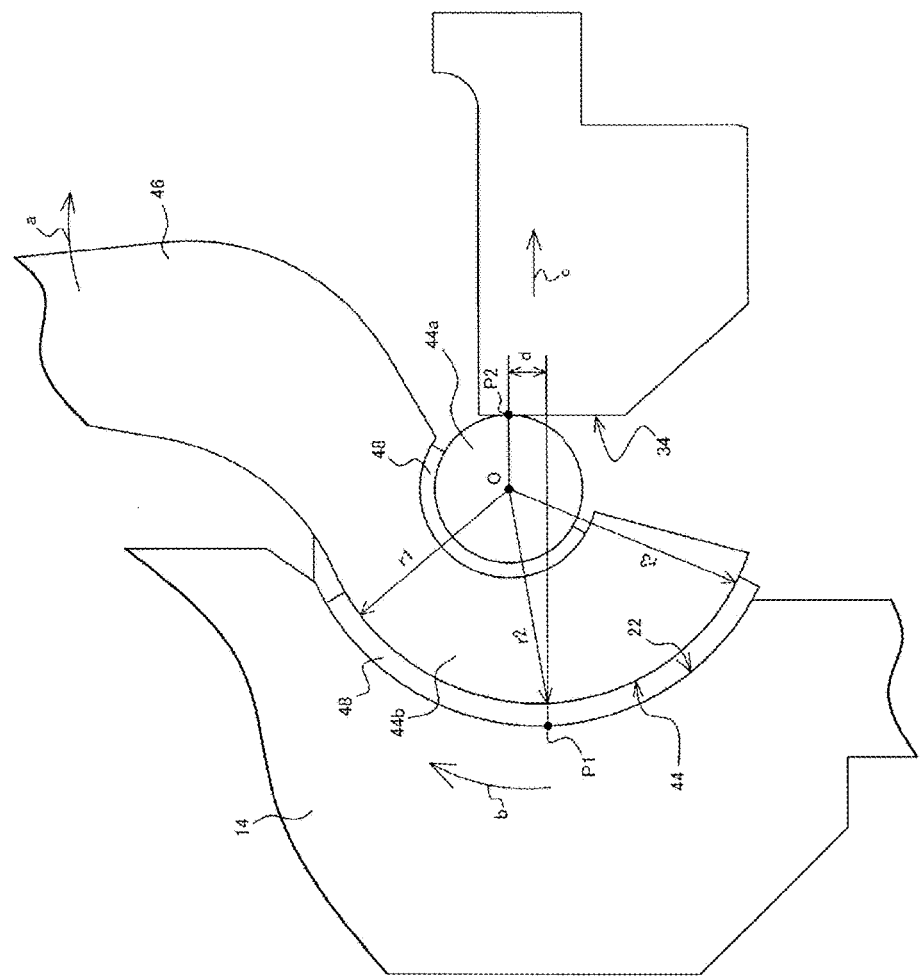
FIG. 5 is a partially enlarged view of a cam mechanism for explanation thereof.

The cam part 44 of the first embodiment includes an eccentric member 44b serving as the center of rotation and a cylindrical pin 44a arranged on the inner peripheral side of the eccentric member 44b. The pin 44a has a length corresponding to the width of the eccentric member 44b. The cam outer peripheral surface part of the eccentric member 44b has, as a sliding surface with respect to the support part 22, an arc surface with the pin 44a as the center. The thickness of the eccentric member 44b changes continuously along the arc surface and thus the distance from the pin center to the arc surface changes continuously. For the distances r1 to r3 from the center point O shown in FIG. 5, there is established the relationship r1<r2<r3.

With this structure, by moving the eccentric member 44b interposed between the support part 22 and reaction force receiver 34 such that the thickness thereof is caused to change, the distance between the support part 22 and reaction force receiver 34 can be changed. That is, when the small-thickness r1 side portion of the eccentric member 44b is arranged between the support part 22 and reaction force receiver 34, to the piston side pad 50 (the details of which are described later), there are applied the pressing forces given by the operating springs 36. Meanwhile, when the large-thickness r3 side portion of the eccentric member 44b is arranged between the support part 22 and reaction force receiver 34, the pressing forces by the operating springs 36 applied to the piston side pad 50 are released. Here, the cam part 44 of the first embodiment is structured to differ in thickness continuously in such a manner that, in the assembled state thereof, the portion thereof situated on the radial-direction outer peripheral side of the rotor 70 decreases in thickness and the portion thereof situated on the radial-direction inner peripheral side of the rotor 70 increases in thickness.

Here, in the first embodiment, a width d between a contact point P1 of the cam part 44 with the support part 22 and a contact point P2 of the cam part 44 with the reaction force receiver 34 is set smaller than the diameter of the pin 44a. This is for efficient transmission of force.

To the small-thickness side portion of the eccentric member 44b (the portion situated on the radial-direction outer peripheral side of the rotor 70), there is connected a lever part 46 which is used to connect two eccentric members 44b across the piston 28. When the lever part 46 is tilted in the axial direction (X) of the rotor 70, it plays the role of a rotation force input part for rotating the eccentric member 44b. In the first embodiment, when the lever part 46 is tilted in a direction to part away from the rotor 70, the eccentric member 44b is rotated in a direction to release the pressing forces given by the operating springs 36.

In the first embodiment, between the support part 22 and eccentric member 44b, and, between the eccentric member 44b and pin 44a, there are interposed sliding members 48 respectively, thereby reducing resistance in sliding. The sliding member 48 is not particularly limited, for example, it may be a bearing with a roller or an Oiles bearing.

On such surface of the body main body 14 as is opposed to the rotor 70, there is arranged the piston side pad 50. The piston side pad 50 is basically constituted of a lining 52 functioning as a friction member and a pressure plate 54 made of a steel plate, while the adjust pin 38 is contacted with the pressure plate 54.

The claw part 18 is arranged opposed to the body main body 14 and plays a role of receiving a pressing force transmitted through the piston 28 and putting the rotor 70 between the piston side pad 50 and claw side pad 56. Thus, on such surface of the claw part 18 as is opposed to the rotor 70, there is arranged the claw side pad 56. The claw side pad 56, similarly to the above-mentioned piston side pad 50, is basically constituted of a lining 58 and a pressure plate 60, while the pressure plate 60 is fastened to the claw part 18.

In the disc brake apparatus 10 of the first embodiment, on the outer peripheral side of the claw part 18 (that is, the side surface located on the opposite side to the side surface on which the rotor 70 is arranged), there is arranged the air chamber 62 serving as an actuator for inputting an operating force into the lever part 46 of the cam mechanism 42. Since the air chamber 62 is arranged on such claw part 18 side outer peripheral surface of the caliper body 12 as is located on the opposite side to the arranged positions of the operating springs 36, the body main body 14 and bridge part 16 can be slimmed. The air chamber 62, when the rod 64 thereof is connected to the lever part 46 of the cam mechanism 42, is enabled to operate the cam mechanism 42 according to the expansion and contraction of the rod 64.

Figure 3:
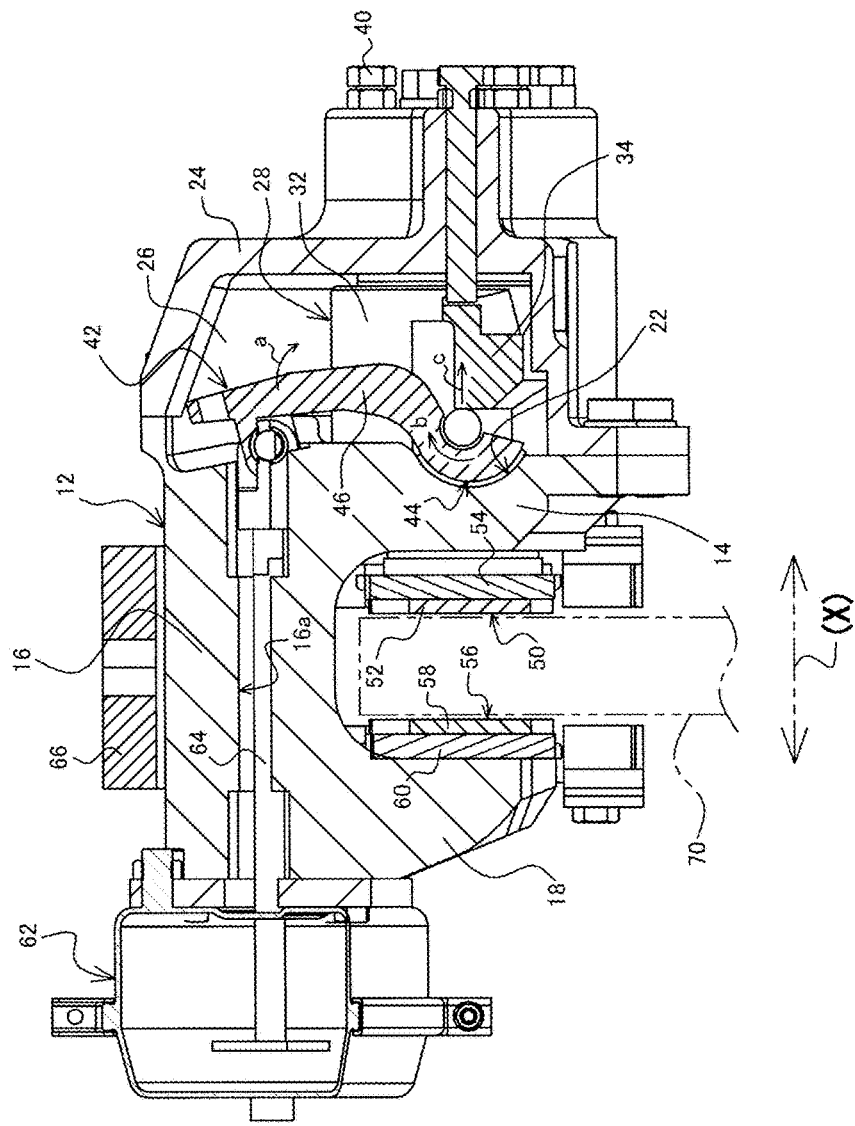
FIG. 3 is a partial section view of a part shown by the arrow A-A of FIG. 1.

The bridge part 16 plays a role of connecting the body main body 14 and claw part 18 to each other across the rotor 70. In the bridge part 16 of the first embodiment, as shown in FIG. 3, there is formed a penetration hole 16a along the axial direction (X) of the rotor 70. The penetration hole 16a allows the outer periphery of the claw part 18 and the bore 26 formed in the body main body 14 to communicate with each other, while the rod 64 of the air chamber 62 is inserted into the penetration hole 16a.

This structure prevents the cam mechanism 42 and rod 64 serving as movable parts from being exposed to the outside. This eliminates a fear that dust can attach to the movable parts and sliding part to disturb the operation thereof.

In the above-structured disc brake apparatus 10, in the non-operating state, a pressing force is applied to the piston 28 by the action of the operating springs 36. Thus, the adjust pin 38 threadedly engaged with the piston 28 presses the pressure plate 54 of the piston side pad 50, while the lining 58 of the piston side pad 50 is pressed against the sliding surface of the rotor 70.

When the lining 58 of the piston side pad 50 is pressed against the sliding surface of the rotor 70, a reaction force against such pressure causes the body main body 14 of the caliper body 12 to slide in a direction to part away from the rotor 70. In this case, the claw part 18, because it is connected to the body main body 14 by the bridge part 16 existing across the rotor 70, is caused to slide in a direction to approach the rotor 70.

Thus, the lining 58 of the claw side pad 56 arranged on such surface of the claw part 18 as is opposed to the rotor 70 is pressed against the sliding surface of the rotor 70. Due to this action, the rotor 70 is sandwiched by the piston side pad 50 and claw side pad 56, thereby maintaining a state where a braking force is working.

Next, when the air chamber 62 serving as an actuator is actuated, the rod 64 is projected toward the body main body 14. With projection of the rod 64, the lever part 46 of the cam mechanism 42 is tilted in the arrow a (see FIG. 3) direction. When the lever part 46 is tilted, the eccentric member is rotated in the arrow b (see FIG. 3) direction with the center point O of the pin 44a as a base point and, due to the change of the thickness thereof, the reaction force receiver 34 is pushed back in the arrow c (see FIG. 3) direction. The push-back of the reaction force receiver 34 causes the piston 28 to slide in a direction to release the pressing force of the operating spring 36. This releases the pressure of the piston side pad 50 and the pressure of the claw side pad 56 respectively pressed by the adjust pin 38.

According to the disc brake apparatus 10 of the first embodiment, the action of the cam mechanism 42 can release the pressing force of the operating spring 36 without using hydraulic pressure. Also, the cam mechanism 42 receives the pressing force of the operating spring 36 in the thickness direction of the eccentric member 44b. Thus, when compared with a case where a pressing force is received on the side surface of the rotation shaft as in the cam mechanism disclosed in the prior art, the durability of the cam mechanism 42 can be enhanced.

Figure 7:
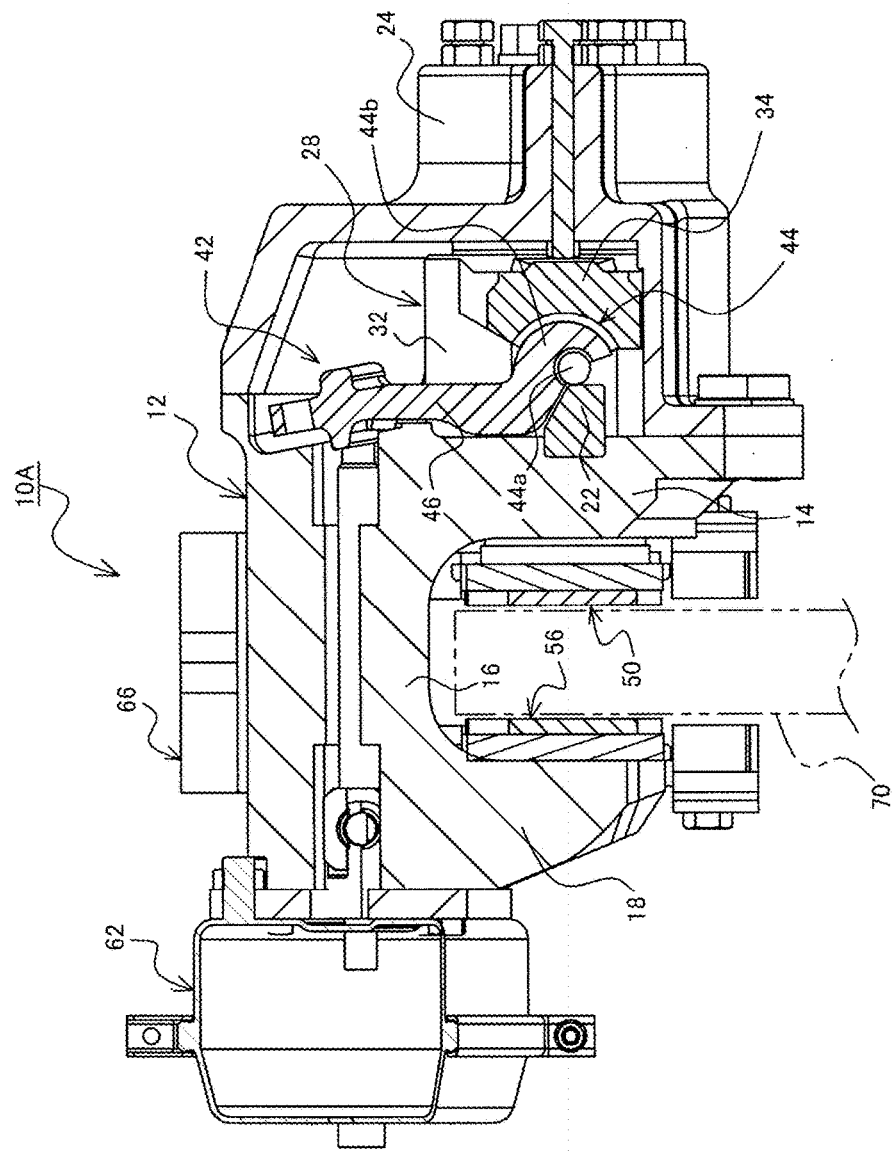
FIG. 7 is a partial section view of the structure of a disc brake apparatus according to a second embodiment of the invention.
Figure 8:
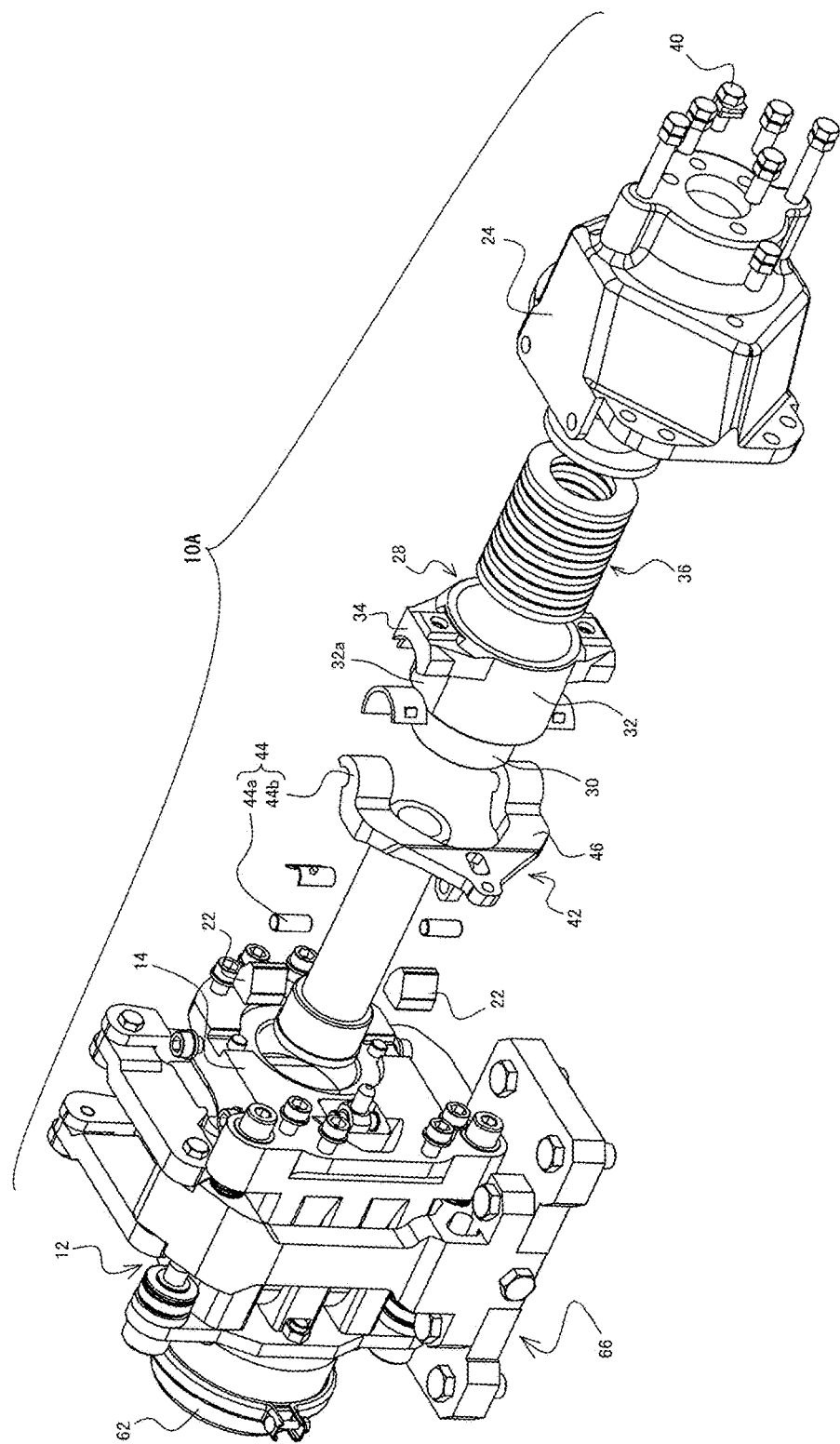
FIG. 8 is an exploded perspective view of the structure of the disc brake apparatus of the second embodiment.

Next, description is given of a second embodiment of the disc brake apparatus of the invention with reference to FIGS. 7 and 8. Most of the structures of a disc brake apparatus 10A of the second embodiment are similar to the disc brake apparatus 10 of the first embodiment. Thus, the parts having the same structures are given the same designations in the drawings and the detailed description thereof is omitted.

The disc brake apparatus 10A of the second embodiment is different in the arranged state of the cam mechanism 42 from the first embodiment. Specifically, in the disc brake apparatus 10 of the first embodiment, the arc of the eccentric member 44b is arranged toward the body main body 14 and the pin 44a is contacted with the reaction force receiver 34. Meanwhile, in the disc brake apparatus 10A of the second embodiment, the arc of the eccentric member 44b is arranged toward the reaction force receiver 34 and the pin 44a is contacted with the support part 22.

With the cam mechanism 42 arranged in this state, when the lever part 46 is tilted, the action produced by the rotation of the cam part 44 is reversed. Thus, the cam part 44 of the second embodiment, the thickness of such portion of the rotor 70 as is located on the radial-direction outer peripheral side is large and the thickness of such portion of the rotor 70 as is located on the radial-direction inner peripheral side is small. The lever part 46 is connected to the large-thickness portion.

As the arrangement of the eccentric member 44b and pin 44a is different, the form of the contact surface between the support member 22 and reaction force receiver 34 is also different. This is for stabilization of the arranged states of the eccentric member 44b and pin 44a. In the second embodiment, the support part 22 is formed separately from the body main body 14. The support part 22 arranged in the body main body 14 has, in the lateral portion of the linking part 32 of the piston 28, a surface which can be contacted with a flat surface 32a formed along the projecting direction of the reaction force receiver 34. Thus, the support part 22 plays a role of stopping the rotation of the piston 28.

Even when the cam mechanism 42 is structured in this manner, the disc brake apparatus 10A of the second embodiment can provide similar effects to the disc brake apparatus 10 of the first embodiment. Here, the other structure operations and effects of the disc brake apparatus 10A of the second embodiment are similar to the disc brake apparatus 10 of the first embodiment.

Figure 9:
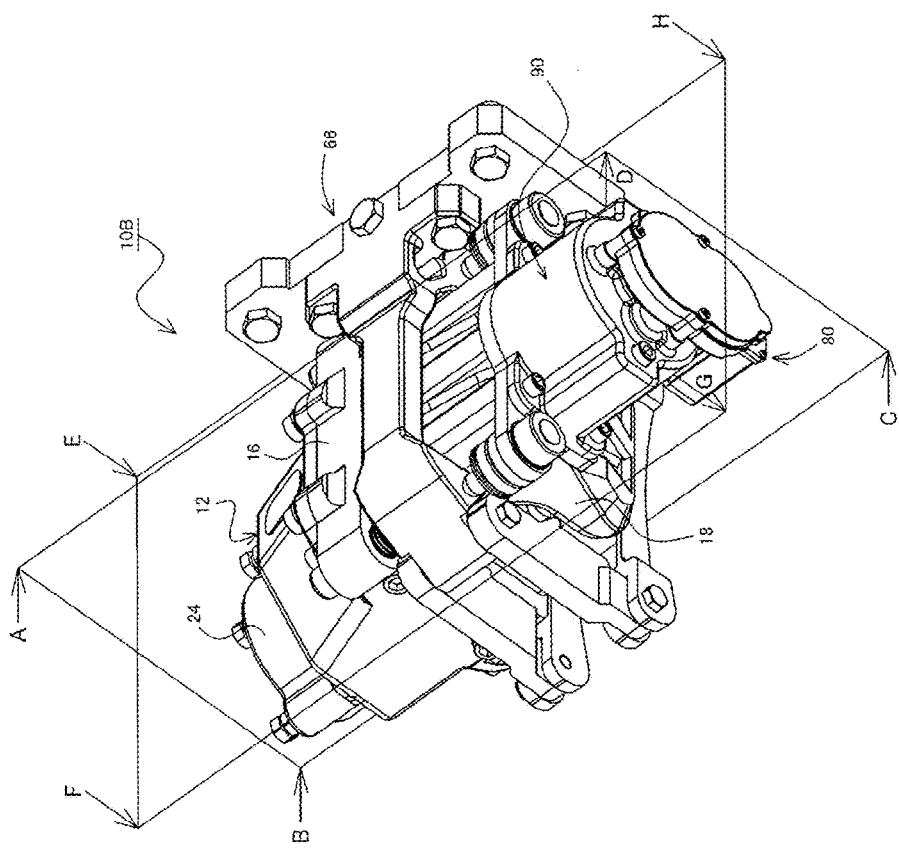
FIG. 9 is a perspective view of the structure of a disc brake apparatus according to a third embodiment of the invention.
Figure 10:
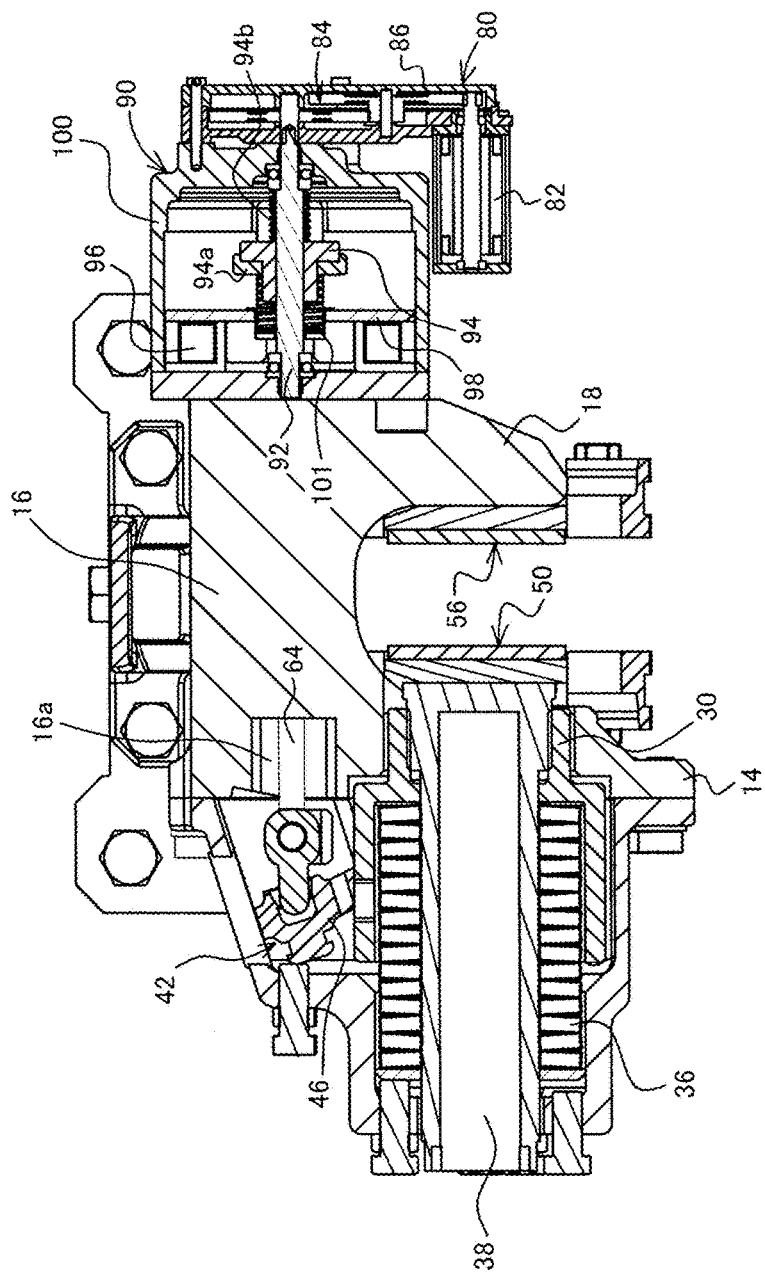
FIG. 10 is a section view of the structure of the ABCD section of FIG. 9.
Figure 11:
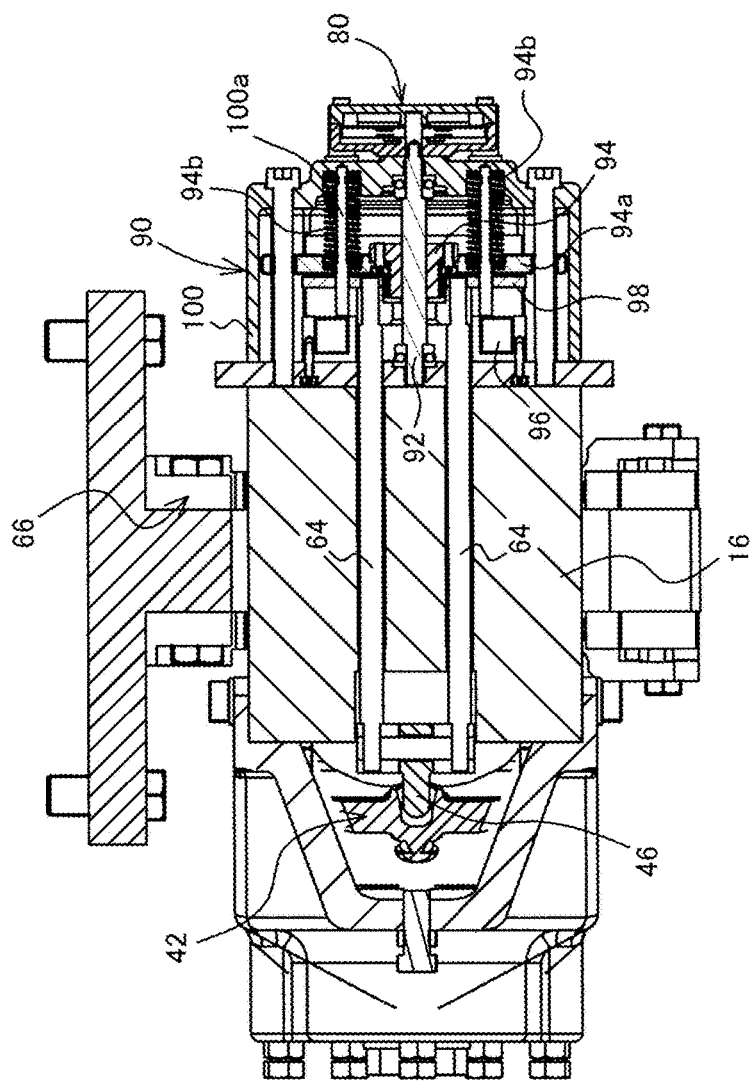
FIG. 11 is a section view of the structure of the EFGH of FIG. 9, showing a state where the brake is operating.
Figure 12:
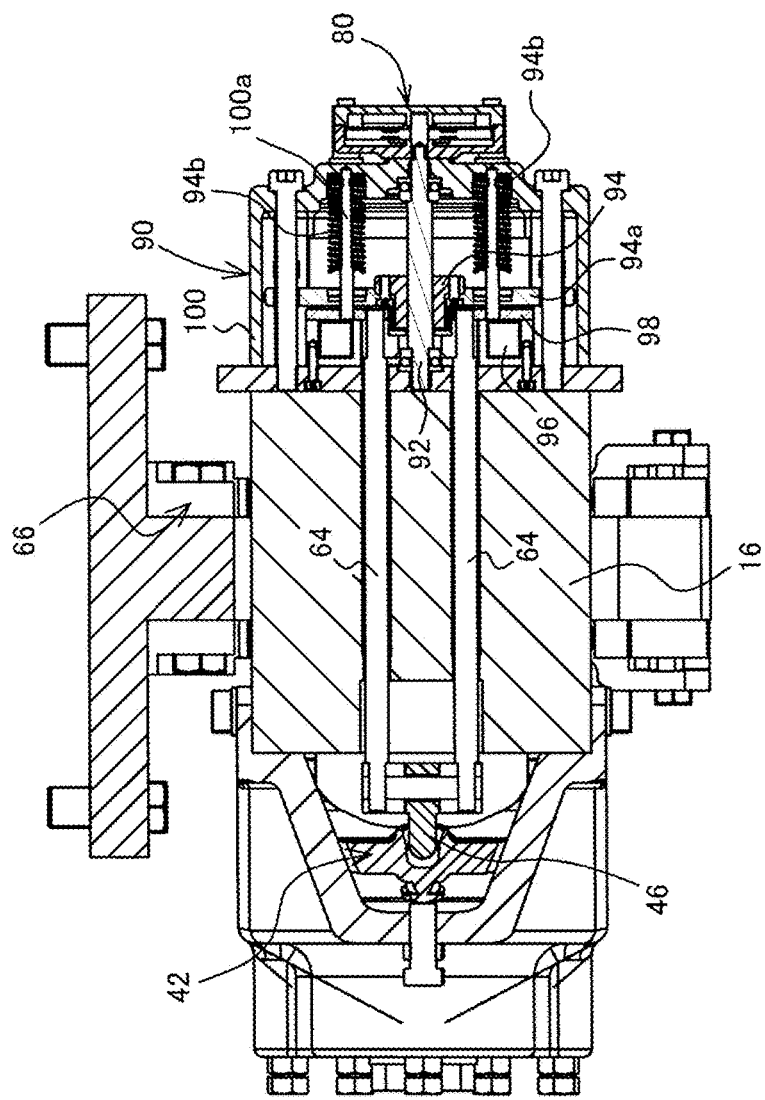
FIG. 12 is a section view of the structure of the EFGH of FIG. 9, showing a state where the brake is released.
Figure 13:
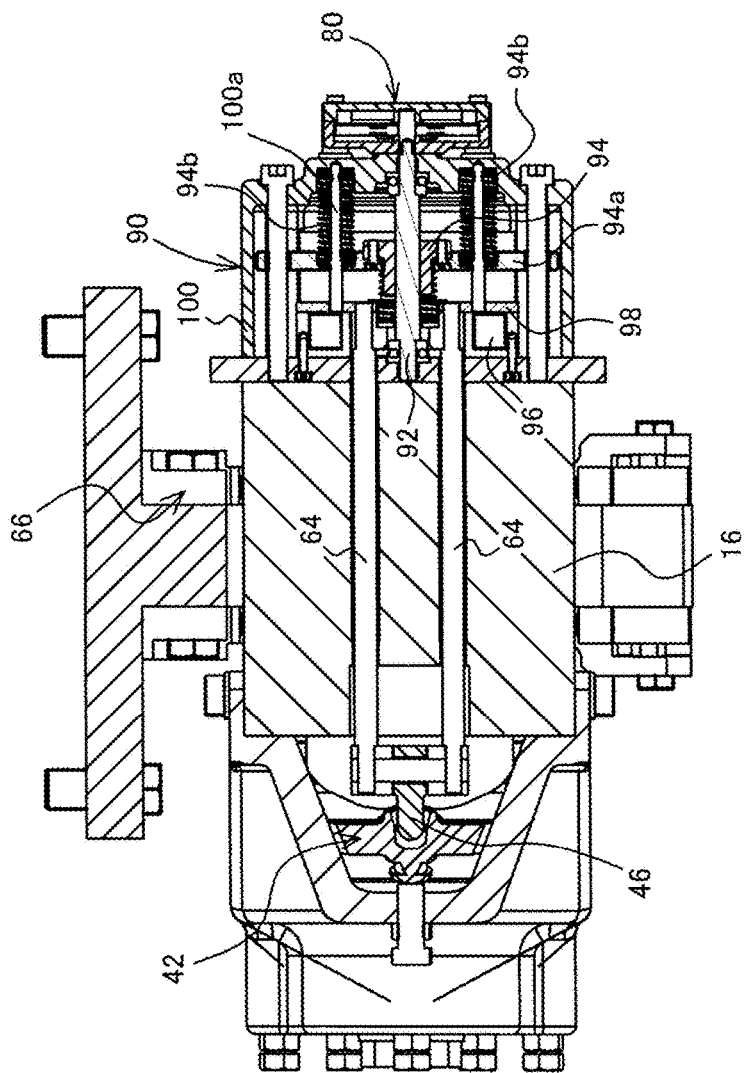
FIG. 13 is a section view of the structure of the EFGH of FIG. 9, showing a state where only the ball nut and nut holder are pulled back.

Next, description is given of a third embodiment of the disc brake apparatus of the invention with reference to FIGS. 9 to 13. FIG. 9 is a perspective view of the structure of a disc brake apparatus according to the third embodiment, and FIG. 10 is a section view of the structure of the ABCD section of FIG. 9. FIGS. 11 to 13 are section views of the structure of the EFGH of FIG. 10.

Most of the structures of a disc brake apparatus 10B of the third embodiment are similar to the disc brake apparatuses 10 and 10A of the first and second embodiments. Thus, the parts having the same structures are given the same designations in the drawings and the detailed description thereof is omitted.

The disc brake apparatus 10B of the third embodiment is different in the structure of the actuator from the disc brake apparatuses 10 and 10A of the first and second embodiments. Specifically, in the disc brake apparatus 10B of the third embodiment, a motor gear unit 80 is used as an actuator and a ball screw unit 90 is attached to the motor gear unit 80, whereby a rod 64 serving as a connecting member for connection with a lever part 46 constituting the cam mechanism 42 can be pushed and pulled.

The motor gear unit 80 includes a motor 82 and a gear unit 84 for transmitting the rotation force of the motor 82 to a ball screw 92 (which is discussed later). The gear unit 84 is constituted of multiple gear arranged within a casing 86 and, by changing the gear ratio, generates torque for rotating the ball screw 92.

The ball screw unit 90 is basically constituted of a ball screw 92 and a ball nut 94, an electromagnet 96, an electromagnetic plate 98, and a casing 100. The ball screw 92 is a rotation shaft to which the rotation force of the motor 82 can be transmitted from the motor gear unit 80. The ball nut 94 is a slider which, as the ball screw 92 rotates, moves on the ball screw 92 along the axial direction of the ball screw 92. Due to employment of this mechanism, even when torque generated by the motor 82 and gear unit 84 is small, the ball screw 92 can be rotated to release the pressing force of the operating spring 36.

To the ball nut 94 of the third embodiment, there is attached a nut holder 94a. The nut holder 94a moves together with the operation of the ball nut 94 to play a role of pressing the electromagnetic plate 98, and also to play a role of receiving the pressing force of a preset spring 94b interposed between the casing 100 and nut holder 94a. When the ball nut 94 is moved toward the arranged side of the motor gear unit 80 to cut off power supply to the motor 82, the preset spring 94b plays a role of pushing back the nut holder 94a to thereby return the ball nut 94 to its initial position.

The electromagnet 96 is arranged on the caliper body 12 arranged side of the ball screw unit 90 and plays a roll of sucking the electromagnetic plate 98. The electromagnetic plate 98 may be a flat plate made of magnetic material to be sucked when the electromagnet 96 is operated.

The electromagnetic plate 98 is a plate with the rod 64 fastened thereto and, when the electromagnetic plate 98 moves in the axial direction of the ball screw 92, the rod 64 is pushed out or pulled back. Between the electromagnet 96 and casing 100, there is interposed a guide stud 100a so as to penetrate through the nut holder 94a and electromagnetic plate 98. Here, when interposing the above-mentioned preset spring 94b between the nut holder 94a and casing 100, it may be disposed so as to surround the guide stud 100a.

The casing 100 is an outline for storing therein the above-mentioned ball screw 92, ball nut 94, nut holder 94a, electromagnet 96, electromagnetic plate 98, preset spring 94b and guide stud 100a.

In the thus-structured disc brake apparatus 10B, a state shown in FIG. 11 where the nut holder 94a and electromagnetic plate 98 are both preset at their initial positions (on the motor gear unit 80 arranged side) provides a state where the pressing force of the operating spring 36 is acting (that is, a state where brake is on). When the motor 82 is driven from this state to operate the motor gear unit 80, the ball screw 92 of the ball screw unit 90 is rotated in the forward direction (for example, is rotated clockwise). Thus, the ball nut 94 moves in the arranged direction of the electromagnet 96 along the axial direction of the ball screw 92. In this case, the nut holder 94a attached to the ball nut 94 presses the electromagnetic plate 98. Accordingly, the rod 64 is pushed out and the cam mechanism 42 is operated to release the pressing force of the operating spring 36, thereby releasing brake.

As shown in FIG. 12, in the case that the electromagnetic plate 98 is pushed to the electromagnet 96, when power is being supplied to the electromagnet 96, the electromagnetic plate 98 is sucked by the electromagnet 96. Thus, even when power supply to the motor 82 is cut off, the brake released state can be maintained.

Here, the ball nut 94, when motor power supply is cut off, is caused to move to the holding brake force action position (initial position) determined by the load of the preset spring 94b and the spring 101.

After the electromagnetic plate 98 is sucked by the electromagnet 96, reverse phase power is supplied to the motor 82. Thus, the motor 82 is driven by reverse rotation and the ball screw 92 to be rotated through the gear unit 84 is also rotated in a reverse rotation direction (for example, is rotated counterclockwise). Due to reverse rotation of the ball screw 92, the ball nut 94 moves together with the nut holder 94a in a direction to part away from the electromagnet 96. After the ball nut 94 is moved, since power supply to the motor 82 is cut off, the ball nut 94 is pushed back to the initial position through the nut holder 94a which has received the force of the preset spring 94b.

In this state, when power supply to the electromagnet 96 is cut off, the cam mechanism 42 is pushed back by the force of the operating spring 36. Along with this, the rod 64 is also pushed back, whereby the electromagnetic plate 98 with the end part of the rod 64 fastened thereto is contacted with the nut holder 94a. Thus, after the electromagnetic plate 98 is sucked and held by the electromagnet 96, the ball nut 94 is pulled back to the initial position; and thus, when the pressing force of the operating spring 36 is loaded, there is no possibility that the motor gear unit 80 can provide an operation resistance. Thus, responsiveness during braking operation can be maintained properly.

Even the disc brake apparatus 10B of the third embodiment in which the actuator is structured as described above can provide similar effects to the disc brake apparatuses 10 and 10A of the first and second embodiments.

Here, the characteristics of the above embodiments of the disc brake apparatus of the invention are summarized below in brief.

[1] A disc brake apparatus (10, 10A, 10B) structured such that, on receiving a pressing force from an operating spring (36), a piston (28) arranged within a cylinder (20) formed in a caliper body (12) presses brake pads (a piston side pad 50 and a claw side pad 56), wherein the disc brake apparatus includes a support part (22) formed in a part of the caliper body, a reaction force receiver (34) provided on and projected from the lateral side of the piston and opposed to the support part, and cam parts (44) interposed between the support part and the reaction force receiver and, on receiving a rotation force, capable of spreading the distance between the support part and the reaction force receiver to thereby release the pressing force.

[2] A disc brake apparatus (10, 10A, 10B) according to the above [1] apparatus, wherein the operating spring (36) is disc springs arranged in layers, and, in a penetration hole formed in the center of each of the disc springs, there is arranged a hold shaft (an adjust pin 38) with the two ends thereof supported on the caliper body (12) so as to be slidable in the axial direction (X) of a rotor (70).

[3] A disc brake apparatus (10, 10A, 10B) according to the above [2] apparatus, wherein the cam parts (44) are arranged so as to be line symmetrically paired with the piston (28) as a base point, and to the paired cam parts, there are connected rotation force input parts (lever parts 46) to be connected to the paired cam parts across the piston.

[4] A disc brake apparatus (10, 10A, 10B) according to the above [3] apparatus, wherein, on such side surface of the caliper body (12) as is located on the opposite side to the arranged position of the operating spring (36), there is provided an actuator (an air chamber 62 or a motor gear unit 80) for inputting an operating force into the rotation force input parts (lever parts 46).

[5] A disc brake apparatus (10, 10A, 10B) according to the above [4] apparatus, wherein the rotation force input parts (lever parts 46) and the actuator (air chamber 62 or motor gear unit 80) are connected to each other by connecting members (rods 64) to be inserted into hole parts (penetration holes 16a) formed in the caliper body (12).

[6] A disc brake apparatus (10, 10A) according to the above [5] apparatus, wherein the actuator is an air chamber (62) for operating the connecting members (rods 64) with the force of air.

[7] A disc brake apparatus (10B) according to the above [5] apparatus, wherein the actuator is a motor gear unit (80) for applying an operating force in a direction to release the pressing force to the rotation input parts (lever parts 46) through the connecting members (rods 64).

[8] A disc brake apparatus (10B) according to the above [7] apparatus, wherein, to the motor gear unit (80), there are attached a ball screw (a ball screw 92) rotatable with the operation of the motor gear unit (80), and a ball nut (94) movable along the ball screw, and the connecting members (rods 64) are pushed out by the ball nut.

[9] A disc brake apparatus (10B) according to the above [8] apparatus, wherein each of the connecting members (rods 64) includes a magnetic body (an electromagnetic plate 98) and, in the push-out position of the connecting member, there is provided an electromagnet (96) capable of sucking the magnetic body.

[10] A disc brake apparatus (10, 10A, 10B) according to any one of the above [2] to [9] apparatuses, wherein the hold shaft (adjust pin 38) includes a threaded engagement part between the piston (28) and itself, and one of the two end parts of the hold shaft can slide through the piston to the caliper body (12), and the hold shaft can adjust a clearance between the brake pads (piston side pad 50 and claw side pad 56) and itself through the threaded engagement part.

[11] A disc brake apparatus (10A) according to any one of the above [1] to [10] apparatuses, wherein the piston (28) includes on the lateral part thereof a flat surface (32a) formed along the projecting direction of the reaction force receiver (34), and the support part (22) includes a surface to be contacted with the flat surface.

The disc brake apparatus of the invention is not limited the above embodiments but can be modified or improved properly. The materials, shapes, dimensions, number, arranging locations and the like of the respective composing elements in the above embodiments are arbitrary but are not limited so long as they can attain the invention.

The present application is based on the Japanese patent application (2014-253711) filed on Dec.16, 2014, the Japanese patent application (2015-40026) filed on Mar. 2, 2015, and the Japanese patent application (2015-234064) filed on Nov. 30, 2015, and the contents thereof are incorporated herein by references.

INDUSTRIAL APPLICABILITY

According to the disc brake apparatus of the invention, there can be provided a negative type disc brake apparatus which includes a pressing force releasing mechanism using other pressure than hydraulic pressure and can enhance durability as well.

DESCRIPTION OF REFERENCE NUMERALS AND SIGNS

10, 10A, 10B: Disc brake apparatus
12: Caliper body
14: Body main body
16: Bridge part
16a: Penetration hole (hole part)
18: Claw part
20: Cylinder
22: Support part
24: Case
26: Bore
28: Piston
30: Sliding part
30a: Penetration hole
32: Linking part
32a: Flat surface
34: Reaction force receiver
36: Operating spring
38: Adjust pin (hold shaft)
40: Adjust bolt
42: Cam mechanism
44: Cam part
44a: Pin
44b: Eccentric member
46: Lever part (rotation force input part)
48: Sliding member
50: Piston side pad (brake pad)
52: Lining
54: Pressure plate
56: Claw side pad (brake pad)
58: Lining
60: Pressure plate
62: Air chamber (actuator)
64: Rod (connecting member)
66: Support
70: Rotor
80: Motor gear unit (actuator)
82: Motor
84: Gear unit
86: Casing
90: Ball screw unit
92: Ball screw (ball screw)
94: Ball nut
94a: Nut holder
94b: Preset spring
96: Electromagnet
98: Electromagnetic plate (magnetic body)
100: Casing
100a: Guide stud
101: Spring

The invention claimed is:

1. A disc brake apparatus in which a piston arranged within a cylinder formed in a caliper body presses brake pads on receiving a pressing force from an operating spring, the disc brake apparatus comprising:
   a support part formed in a part of the caliper body;
   a reaction force receiver projected from a side of the piston and opposed to the support part;
   a cam part which is interposed between the support part and the reaction force receiver, and is capable of spreading a distance between the support part and the reaction force receiver to thereby release the pressing force on receiving a rotation force; and
   a rotation force input part connected to the cam part,
   wherein a rotating axis of the cam part perpendicular to an axial direction of the piston, and
   wherein an actuator that inputs an operating force into the rotation force input part is provided on a side surface of the caliper body located on an opposite side to an arranged position of the operating spring.

2. The disc brake apparatus according claim 1, wherein the operating spring comprises disc springs arranged in layers, and,
   wherein a hold shaft is arranged in a penetration hole formed in the center of each of the disc springs, and two ends of the hold shaft are supported on the caliper body so as to be slidable in an axial direction of a rotor.

3. The disc brake apparatus according to claim 1, wherein the rotation force input part and the actuator are connected to each other by a connecting member to be inserted into a hole part formed in the caliper body.

4. The disc brake apparatus according to claim 3, wherein the actuator comprises an air chamber that operates the connecting members with the force of air.

5. The disc brake apparatus according to claim 3, wherein the actuator comprises a motor gear unit that applies an operating force in a direction to release the pressing force to the rotation force input parts through the connecting members.

6. The disc brake apparatus according to claim 5, wherein, to the motor gear unit, there are attached a ball screw rotatable with the operation of the motor gear unit, and a ball nut movable along the ball screw, and
wherein the connection member is pushed out by the ball nut.

7. The disc brake apparatus according to claim 6, wherein the connecting member includes a magnetic body, and
wherein an electromagnet capable of sucking the magnetic body is provided in a push-out position of the connecting member.

8. The disc brake apparatus according to claim 2,
wherein the hold shaft is provided with a threaded engagement part between the piston and itself,
wherein one of the two end parts of the hold shaft is capable of sliding through the piston to the caliper body, and
wherein the hold shaft is capable of adjusting a clearance between the brake pads and itself through the threaded engagement part.

9. The disc brake apparatus according to claim 1, wherein the reaction force receiver positions between the operating spring and the cam part in the axial direction of the piston.

10. A disc brake apparatus in which a piston arranged within a cylinder formed in a caliper body presses brake pads on receiving a pressing force from an operating spring, the disc brake apparatus comprising:
a support part formed in a part of the caliper body;
a reaction force receiver projected from a side of the piston and opposed to the support part; and
cam parts which are interposed between the support part and the reaction force receiver, and are capable of spreading a distance between the support part and the reaction force receiver to thereby release the pressing force on receiving a rotation force,
wherein a rotating axis of each of the cam parts is perpendicular to an axial direction of the piston,
wherein the operating spring comprises disc springs arranged in layers,
wherein a hold shaft is arranged in a penetration hole formed in the center of each of the disc springs, and two ends of the hold shaft are supported on the caliper body so as to be slidable in an axial direction of a rotor,
wherein the cam parts are arranged so as to be line symmetrically paired with the piston as a base point,
wherein, to the paired cam parts, there are connected rotation force input parts to be connected to the paired cam parts across the piston, and
wherein an actuator that inputs an operating force into the rotation force input parts is provided on a side surface of the caliper body located on an opposite side to an arranged position of the operating spring.

11. A disc brake apparatus in which a piston arranged within a cylinder formed in a caliper body presses brake pads on receiving a pressing force from an operating spring, the disc brake apparatus comprising:
a support part formed in a part of the caliper body;
a reaction force receiver projected from a side of the piston and opposed to the support part; and
cam parts which are interposed between the support part and the reaction force receiver, and are capable of spreading a distance between the support part and the reaction force receiver to thereby release the pressing force on receiving a rotation force,
wherein the piston includes on a lateral part thereof a flat surface formed along the projecting direction of the reaction force receiver, and
wherein the support part includes a surface to be contacted with the flat surface.

* * * * *